(12) United States Patent
Burchardt et al.

(10) Patent No.: US 11,239,915 B2
(45) Date of Patent: *Feb. 1, 2022

(54) LI-DRIVE

(71) Applicant: pureLiFi Limited, Edinburgh (GB)

(72) Inventors: Harald Burchardt, Edinburgh (GB); Harald Haas, Edinburgh (GB); Nikola Serafimovski, Edinburgh (GB)

(73) Assignee: pureLiFi Limited, Edinburgh (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/155,906

(22) Filed: Jan. 22, 2021

(65) Prior Publication Data

US 2021/0143908 A1   May 13, 2021

Related U.S. Application Data

(63) Continuation of application No. 16/082,001, filed as application No. PCT/GB2017/050577 on Mar. 3, 2017, now Pat. No. 10,931,375.

(30) Foreign Application Priority Data

Mar. 4, 2016 (GB) .................................... 1603822

(51) Int. Cl.
*H04B 10/114* (2013.01)
*H04B 10/116* (2013.01)
*H05B 47/19* (2020.01)
*H04W 28/08* (2009.01)
*H05B 47/195* (2020.01)

(52) U.S. Cl.
CPC ....... *H04B 10/116* (2013.01); *H04B 10/1143* (2013.01); *H04W 28/08* (2013.01); *H05B 47/19* (2020.01); *H05B 47/195* (2020.01)

(58) Field of Classification Search
CPC .................................................. H04B 10/1143
See application file for complete search history.

(56) References Cited

U.S. PATENT DOCUMENTS

| 5,617,236 A | * | 4/1997 | Wang | .................... | G06F 13/385 |
| | | | | | 375/214 |
| 5,880,868 A | | 3/1999 | Mahany | | |
| 8,526,403 B1 | | 9/2013 | Nadji et al. | | |

(Continued)

FOREIGN PATENT DOCUMENTS

| GB | 2373968 | * | 2/2002 | ............. | H04L 29/06 |
| GB | 2373968 A | | 10/2002 | | |

(Continued)

OTHER PUBLICATIONS

"Connectivity" IBSENtelecom, Retrieved from the Internet: http://www.ibsentelecom.no/technology.html, Aug. 2015.

(Continued)

*Primary Examiner* — Nathan M Cors
(74) *Attorney, Agent, or Firm* — Myers Bigel, P.A.

(57) ABSTRACT

An optical communication access point comprises: an optical communication channel for allowing wireless light communication with a remote device, and a memory for storing content, wherein the content in the memory is accessible by the remote device via the wireless light communication link.

24 Claims, 11 Drawing Sheets

(56) References Cited

U.S. PATENT DOCUMENTS

| | | | | |
|---|---|---|---|---|
| 2007/0143215 | A1* | 6/2007 | Willems | G16H 40/63 |
| | | | | 705/51 |
| 2008/0077666 | A1* | 3/2008 | Sekaran | H04L 12/1827 |
| | | | | 709/204 |
| 2009/0110212 | A1* | 4/2009 | Iwasaki | H04M 3/56 |
| | | | | 381/92 |
| 2009/0257376 | A1 | 10/2009 | Dhanapal et al. | |
| 2012/0143013 | A1* | 6/2012 | Davis, III | G16H 50/20 |
| | | | | 600/300 |
| 2014/0111314 | A1* | 4/2014 | Rietzler | G06Q 10/08 |
| | | | | 340/10.51 |
| 2014/0143034 | A1 | 5/2014 | Pi | |
| 2014/0226977 | A1 | 8/2014 | Jovicic et al. | |
| 2015/0318922 | A1 | 11/2015 | Poola et al. | |

FOREIGN PATENT DOCUMENTS

| | | |
|---|---|---|
| JP | H05199235 A | 8/1993 |
| JP | 2005142773 A | 6/2005 |
| KR | 20150017044 A | 2/2015 |
| WO | 2007069234 A2 | 6/2007 |
| WO | 2016038353 A1 | 3/2016 |

OTHER PUBLICATIONS

"Li-Fi network technology" IBSENtelecom, Retrieved from the Internet: http://www.ibsentelecom.no/technology.html, Aug. 2015. (3 pages).

"LiFi router" IBSENtelecom, Retrieved from the Internet: http://www.ibsentelecom.no/consumer.html, Aug. 2015.

International Search Report and Written Opinion of the International Searching Authority Corresponding to International Patent Application No. PCT/GB2017/050577 dated Jul. 10, 2017. (11 pages).

Search Report corresponding to United Kingdom Patent Application No. 1603822.6 dated Aug. 22, 2016 (4 pages).

Elgala, et al., ""Indoor Broadcasting via White LEDs and OFDM" IEEE Transactions on Consumer Electronics 55 (3):1127-1134 (Aug. 2009)".

Elgala, et al., ""Indoor Optical Wireless Communication: Potential and State-of-the-Art" IEEE Communications Magazine 49(9):56-62 (Sep. 2011)".

* cited by examiner

LI-DRIVE

RELATED APPLICATIONS

The present application is a continuation of U.S. patent application Ser. No. 16/082,001, filed on Sep. 4, 2018, which itself is a 35 U.S.C. § 371 national stage application of PCT International Application No. PCT/GB2017/050577, filed on Mar. 3, 2017, which itself claims priority from Great Britain Patent Application No. 1603822.6, filed on Mar. 4, 2016, the contents of which are incorporated herein by reference in their entireties. The above-referenced PCT International Application was published in the English language as International Publication No. WO 2017/149320 A1 on Sep. 8, 2017.

FIELD OF THE INVENTION

The present invention relates to optical light communication and associated data storage.

BACKGROUND OF THE INVENTION

The need to store large amounts of data has increased dramatically in recent years. Often such data is stored in a network, for example, through data centre and cloud storage. However, the centralisation of stored data presents new challenges to content providers and network operators. In particular, storing data at a central point results in over-utilising network infrastructure to send and receive data to and from the central point. In some circumstances, it is preferable to store data as locally as possible relative to the end-user in order to minimize the load on network resources. This is known as network-edge storage.

The need for network-edge storage is likely to increase significantly over the coming years. One reason for this increase is the advent of the Internet of Things which will potentially see all devices having the capability of sending and receiving data. These data can be stored and distributed locally without the immediate need of being sent via the world-wide-web. Another reason is an expected 70% compound annual growth rate on the demand for wireless communications. This demand, including the generation and consumption of content, will require unprecedented growth with respect to network storage capabilities. Network-edge storage allows data to be stored as close as possible to an end-user and allows frequently used content to be delivered more reliably and quickly to the user. In addition, traffic that would normally traverse the network backbone back to the central storage location is reduced.

Data can include sensitive/confidential (corporate or personal information and/or intellectual property) and so privacy and security are paramount. Currently, the mass-market utilisation of radio frequency technology as the primary mechanism for wirelessly accessing this data has inherent security risks. The pervasiveness of RF signals enables not only eavesdropping of transmitted data, but also network breach and access to potentially confidential information stored on wirelessly accessible devices. This not only causes damages to individuals but also intellectual property losses to content producers and providers alike. The protection of the data and its access is paramount.

SUMMARY OF THE INVENTION

According to one aspect of the present invention, there is provided an optical communication access point comprising: an optical communication channel for allowing wireless light communication with a remote device, and a memory for storing content, wherein the content in the memory is accessible by the remote device via the wireless light communication link.

By providing accessible memory locally in the optical communication access point, there is provided a simple and secure means for storing content locally. For example, data can be stored and downloaded to the remote device using a conventional radio or fixed internet connection and subsequently uploaded for storage on the light access point, so that the data can be accessed locally via the light access point in the absence of an internet connection.

By light, it is meant electromagnetic waves with wavelengths in the range 1 nm to 2500 nm, and including ultraviolet, visible light and near-infrared, and THz communication.

The optical communication access point may be adapted to allow the remote device to download content from the accessible memory and/or upload content to the accessible memory and/or delete content from the accessible memory and/or move content in the accessible memory and/or modify content in the accessible memory.

The access point may be adapted to allow the remote device to download content from the accessible memory.

The wireless communication link may be configured to provide a bi-directional communication channel for sending data to and receiving data from the remote device.

The memory may comprise general purpose memory and/or the content may modifiable by the remote device.

The remote device may comprise a mobile device, for example at least one of a mobile telephone, smartphone, laptop computer or other portable computing device.

The access point may be adapted to upload content to the accessible memory from the remote device and download that content to at least one other different remote device.

The optical communication access point may be adapted to allow only authorised remote devices access to the memory.

The accessible memory may be segmented and different segments are accessible by different remote devices or different groups of remote devices.

The optical communication access point may be adapted to allow access to the accessible memory only on receipt from the remote device of a password and/or encryption key.

The content may include at least one of: written content, audio content or video content.

The access point may be adapted to be connected to an external network, for example the internet.

According to another aspect of the invention, there is provided an optical communication system comprising multiple optical access points each having an optical communication channel for allowing wireless light communication with a remote device, and a memory for storing content that is accessible by the remote device via the wireless light communication link, wherein the multiple optical access points are independent of each other (un-networked), and content is transferrable between the access point memories via the remote device.

According to yet another aspect of the present invention, there is provided an optical communication system comprising multiple optical access points as claimed in any of the preceding claims, wherein the memories of the multiple optical access points are locally networked, thereby to provide distributed memory accessible by the remote device.

Content is downloadable from the distributed memory to the remote device from any access point in the local network and/or content is uploadable to the distributed memory from the remote device from any access point in the local network.

Content may be downloadable from the distributed memory to the remote device from any access point in the local network and/or content may be uploadable to the distributed memory from the remote device from any access point in the local network.

The multiple optical access points may be connectable to an external network, for example the internet.

The multiple optical access points may provide distributed cloud storage.

The system may be adapted to allow access to content in at least one memory based on location of the remote device.

The system may be adapted to allow access to the accessible memory on receipt from the remote device of a password and/or encryption key, wherein the password and/or encryption key is distributed across two or more of the accessible memories.

By networking the multiple optical access points and their storage devices, there is provided a significant increase in the available network storage capacity. Furthermore, network edge capacity can be increased with additional local nodes that are hosted by the users and connected to the local network. Big data and distributed data storage can also be provided by means of a dense network of local data storage devices. Also, by providing a redundant or even distributed storage system, the volume of data storage is increased and security of the data can be further improved.

The access point may be configured so that the content in the memory may change dynamically, and/or may be uploaded by users. Isolation of different access points between rooms may be provided. Separate access point within a room may be provided.

The access point memory may provide general purpose storage modifiable and accessible by a use without the need for special programmes or applications. Reading and/or writing of data from and/or to the memory, and/or other data or content operations, may be performed using standard network storage access/management tools.

Features in one aspect may be provided as features in any other aspect in any appropriate combination.

BRIEF DESCRIPTION OF THE DRAWINGS

Various aspects of the invention will now be described by way of example only, and with reference to the accompanying drawings, of which.

DETAILED DESCRIPTION OF THE DRAWINGS

The present invention provides a light enabled access system that uses lights as access points. The access points allow highly localised access to memory content. In some embodiments, as well as providing localised data storage, the access points are connected to a network and allow access to cloud based content. In all cases, the lighting must be Li-Fi enabled, thereby to allow light based communications. Each optical access point connects to one or more LED lighting fixtures to provide power and modulate the light to deliver data.

Each user has a remote device, typically a mobile device. Each remote device has a receiver for receiving light signals at a first wavelength from the access points and a transmitter for transmitting at a second wavelength to the access points. Each access point has a transmitter for sending visible light signals at the first wavelength to the remote device and a receiver for receiving at the second wavelength from the remote device. The remote device may be a desktop unit. For the avoidance of doubt, throughout this specification, "light" will refer to those electromagnetic waves with wavelengths 1 nm to 2500 nm, and which includes the ultraviolet, visible light and near-infrared wavelengths.

Figure 1:
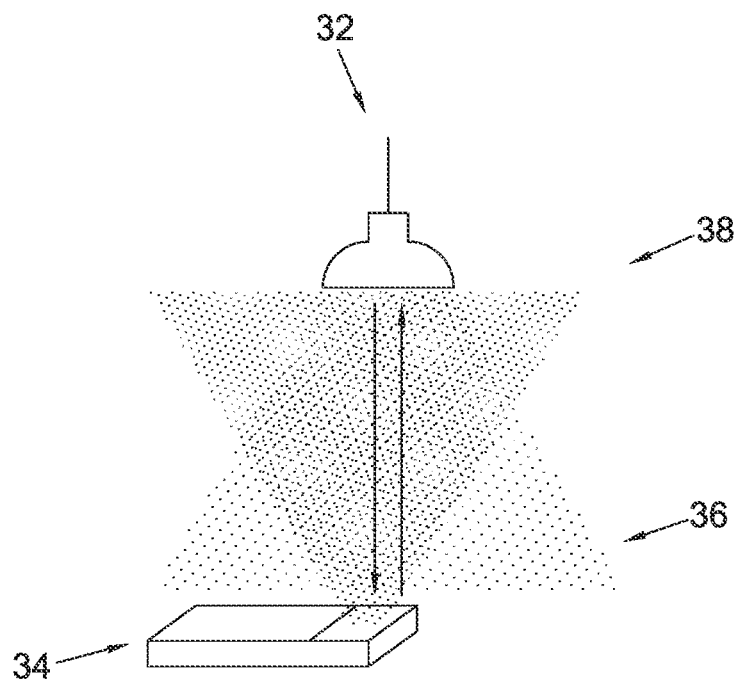
FIG. 1 is a schematic diagram of an optical communication wireless access point and a remote device.

FIG. 1 is a schematic diagram showing a wireless access point 32 communicating with a remote device 34 using optical communication links. Remote device 34 is representative of a local user. An optical light communication field can be emitted from an access point and these fields carry data in the form of optical communication signals. FIG. 1 shows a single wireless access point 32 that emits a first optical communication field 36. A remote device 34 positioned in the optical communication field 36 can be linked to the wireless access point and receives a signal carried on the optical communication field 36. The remote device may also emit a second optical communication field 38 carrying data in the form of a second light communication signal. When the remote device 34 and access point 32 are positioned such that the wireless access point 32 is in the second optical communication field 38 then the wireless access point can receive an optical communication signal sent by the remote device 34. In this way a bi-directional communication channel is created that enables the access point 32 to send data to and receive data from the external device 34. This bi-directional channel will be referred to as an optical communication link.

The single wireless access point 32 includes user accessible storage memory. The incorporation of storage memory into the access point is independent of any applied network thereby allowing the access point to act as a standalone device. This device provides a securely wirelessly accessible electronic storage device that can be encrypted at various levels and can be partitioned for multiple storage areas. It also provides highly localised access to content of interest to users.

Figure 2:
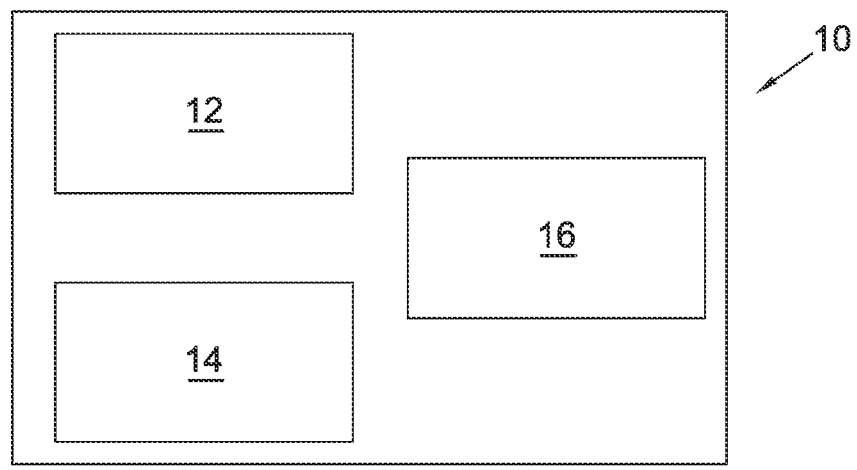
FIG. 2 is a high level block diagram of a wireless access point.

FIG. 2 shows a high level block diagram of a wireless access point 10 for use in the system of FIG. 1. In general, a wireless access point can be broadly defined as having the following three components: a digital platform 12, an analogue electronics and front-end platform 14 and power electronics 16. The digital platform 12 hosts firmware and software necessary for transmitting data to and receiving data from a wireless network. The digital platform comprises several components that operate at different levels of functionality that can be described with reference to the open systems interconnection model. The firmware and software is capable of receiving and delivering data to and from the transport layer. The digital platform 12 also controls the transfer of data between nodes on a single network which corresponds to functionality on the network layer. The digital platform 12 also must control the allocation of resources and data to users corresponding to functionality on the medium access control (MAC) layer. In addition, the digital platform is capable of constructing physical signals corresponding to the physical layer. The analogue electronics and front-end platform 14 are utilised for the actual physical transmission of optical communication signals. The power electronics 16 provide power to the wireless access system.

Figure 3A:
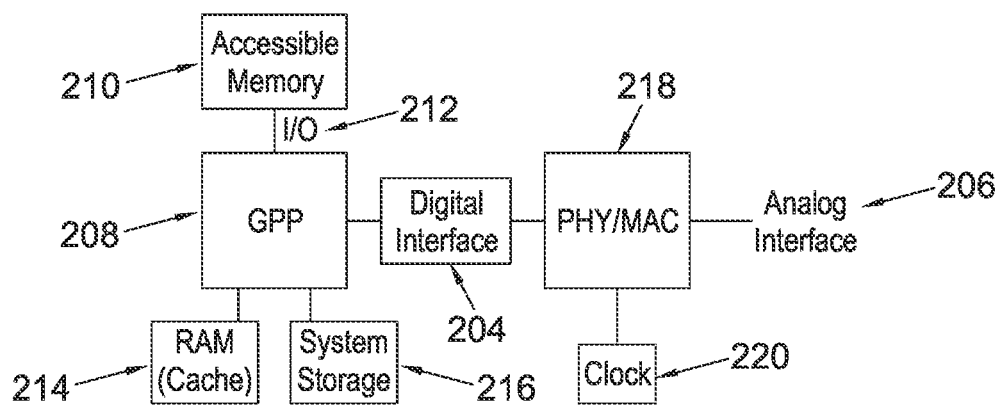
FIG. 3 is a more detailed diagram of an optical communication wireless access point.

FIGS. 3(a) and (b) show two embodiments of the wireless optical communication access point digital platform 12 of FIG. 2. The embodiment of FIG. 3(a) is a standalone platform 12. The embodiment of FIG. 3(b) allows connection to an external network. Each has two interfaces: a digital interface 204 and an analogue interface 206. The embodiment of FIG. 3(b) additionally has a network interface 202. A general purpose processor (GPP) 208 is connected to an accessible memory 210 via an accessible memory connection 212. The general purpose processor 208 is also connected to a random access memory (RAM) 214 and a system storage 216. The digital interface 204 and the analogue interface 206 are bridged by a physical and media access control module 218. The physical and media access control module is connected to a clock 220. The accessible memory 210 is an electronic physical storage device and could be for example, a flash memory, a solid state based memory or a hard disk. The accessible memory connection 212 may be, for example, a Universal Serial Bus (USB), a general purpose input/output (GPIO), a multimedia connect (MMC), or a peripheral component interconnect express (PCIe).

The accessible memory connection 212 provides a primary connection to the general purpose processor 208 allowing access to the accessible memory 210 over an optical communication link. The accessible memory 210 may be a memory chip that is capable of storing local and network data. Once access to the access point is granted, information stored on the accessible memory can be accessed and functions such as upload, download, deletion and movement of data can be performed. Access to the accessible memory can be password protected and/or encrypted and thus controlled. Data stored on the accessible memory can be encrypted itself. The physical and media access control module 218 are configured to generate optical communication signals using the analogue interface 206. Optical communication can include visible light communication. The wireless access point is connected to an LED to produce the physical optical communication signal.

Figure 3B:
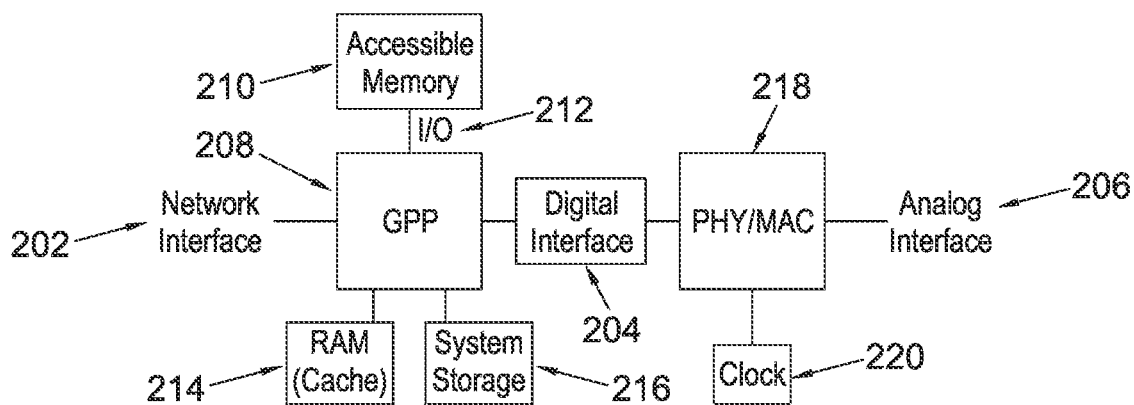

For the embodiment of FIG. 3(b) network layer functionality and the interface 202 to the transport layer are hosted on the general purpose processor 208.

The accessible memory 210 can be partitioned to allow multiple segregated storage spaces. Partitions of the accessible memory can be allocated to different users. A first user may be permitted access to a first partition but not permitted access to a second partition. Different users may be permitted to use different partitions of the memory on the same wireless access point. For example, permission to access data on a first partition may be restricted to a local user and permission to access data on a second partition may be restricted to network use. In addition, data may have different permissions associated with an action requested. Actions include storing, accessing, downloading, uploading, moving, modifying and deleting. In addition, multiple accessible memory modules may be connected to the general purpose processor 208. Additional memory modules can provide increased storage space and can provide additional partitioning of stored data. Redundancy can also be ensured by storing the same data from a first access point onto multiple access points.

Figure 4:
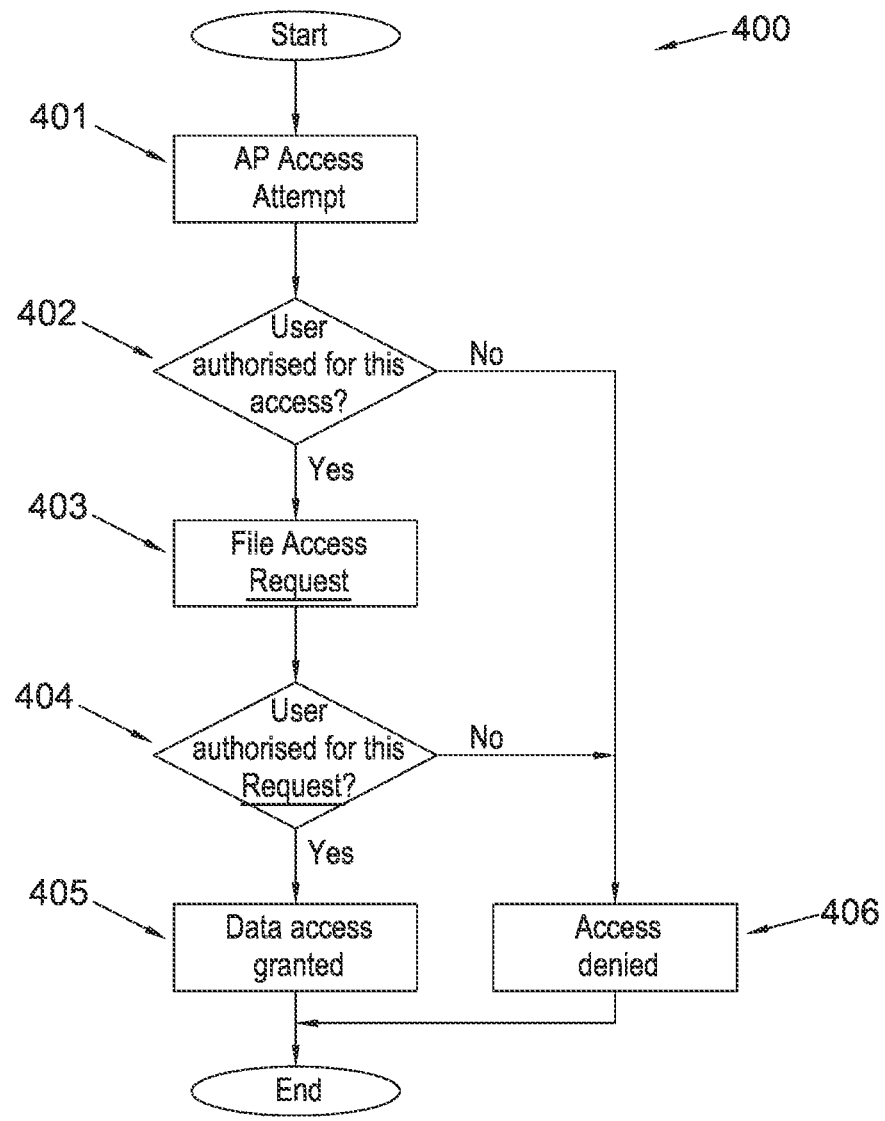
FIG. 4 is a flowchart describing a procedure of accessing data.
Figure 5:
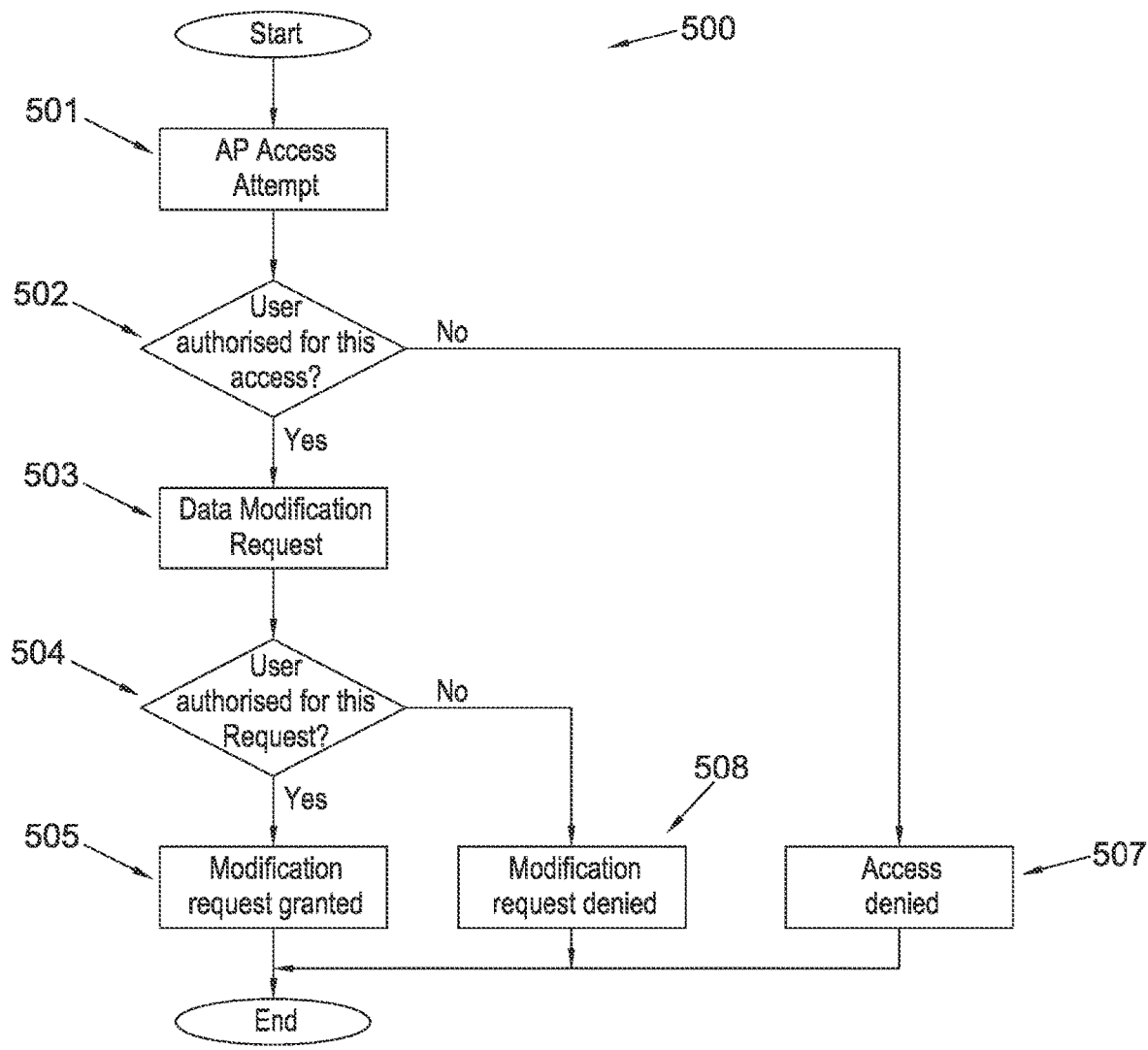
FIG. 5 is a flowchart describing a procedure for modifying data.

FIG. 4 and FIG. 5 are flow diagrams of several techniques for a local user to manipulate data on a standalone access point (e.g. the embodiment of FIG. 3(a)) by a local user.

FIG. 4 shows a schematic flowchart 400 of a procedure for accessing data in a file stored on an accessible memory integrated into the access point 32. The single access point 32 has an accessible memory 210 storing a file. The access point also has access to user permission information that can either be stored on the wireless access point 32 or remotely. A user can refer to any device in the optical communication field of the access point 32, for example the remote device 34. An authorised user is a user that is authorised in accordance with the permission information of the access point 32. Action permission information associated with the file can be stored on the accessible memory or remotely if network enabled. This information contains a set of permitted actions associated with the file. The permissions of a given action may be dependent on the user requesting to carry out the action. For example, each authorised user may have different access, read or download rights for a file.

The procedure 400 begins with an access attempt 401 sent to the access point 32 by a user 34. At step 402, the access point 32 determines whether or not the user 34 is authorised for access to the access point 32. This determination is made using the user permission information available to the access point 32. Following a successful authorisation of the user, the user 34 is now an authorised user. The authorised user 34 makes a file access request 403. The file access request contains specific details of the action requested by the authorised user 34. This request is examined at step 404 using the action permission information associated with the file. If it is determined that the authorised user 34 is permitted to carry out the requested action on the file then access to data stored on the wireless access point 32 is granted at step 405 allowing successful completion of the data access procedure. If it is determined that the user is not authorised at step 402 or if an authorised user is not permitted to carry out the request action at step 404, then access to data on the access point 32 is denied 406 thus terminating the data access procedure of flowchart 400.

FIG. 5 shows a schematic flowchart 500 of a procedure for modifying data in a file stored on an access point accessible memory. As described with reference to FIG. 4, the single access point 32 has access to user permission information. Action permission information associated with data can be stored on the accessible memory or remotely. This information contains a set of permitted actions associated with stored data. For example, different types of stored data may have different permission for each user. For example, a user may have write rights for some file containing a certain type of data but not for other files, and for the storage as a whole. In a further example, a user may be permitted to upload to the access point but not to delete files stores on the access point.

The procedure 500 begins with an access attempt 501 sent to the access point 32 by a user 34. At step 502, the access point 32 determines whether or not the user 34 is authorised for access to the access point 32. This determination is made using the user permission information available to the access point 32. Following a successful authorisation of the user, the user 34 is now an authorised user. The authorised user 34 makes a data modification request 503. The data modification request contains specific details of the data modification action requested by the authorised user 34. This request is examined at step 504 using the action permission information associated with the stored data. If it is determined that the authorised user 34 is permitted to carry out the requested action on the file then access to data stored on the wireless access point 32 is granted at step 505 thereby allowing successful completion of the data modification procedure. If it is determined that the user is not authorised at step 502 then access to wireless access point 32 is denied 507 and the process is terminated. If an authorised user is not permitted to carry out the request modification at step 504, then the modification request is denied 508 and the process is terminated.

FIGS. 4 and 5 describe methods of modifying and accessing data by a local user 34. However, such access and modifying methods are not limited only to a local user. For example, the access point 32 may be connected to a network, for example a local area network, that hosts additional other devices to provide a data distribution network. In this setup, storage in the accessible memory of the access point 32 can be accessed or modified by either the local user or remotely via the network. The accessible memory may also be partitioned into a part accessible only to the local user and a part accessible only via the network.

Figure 6:
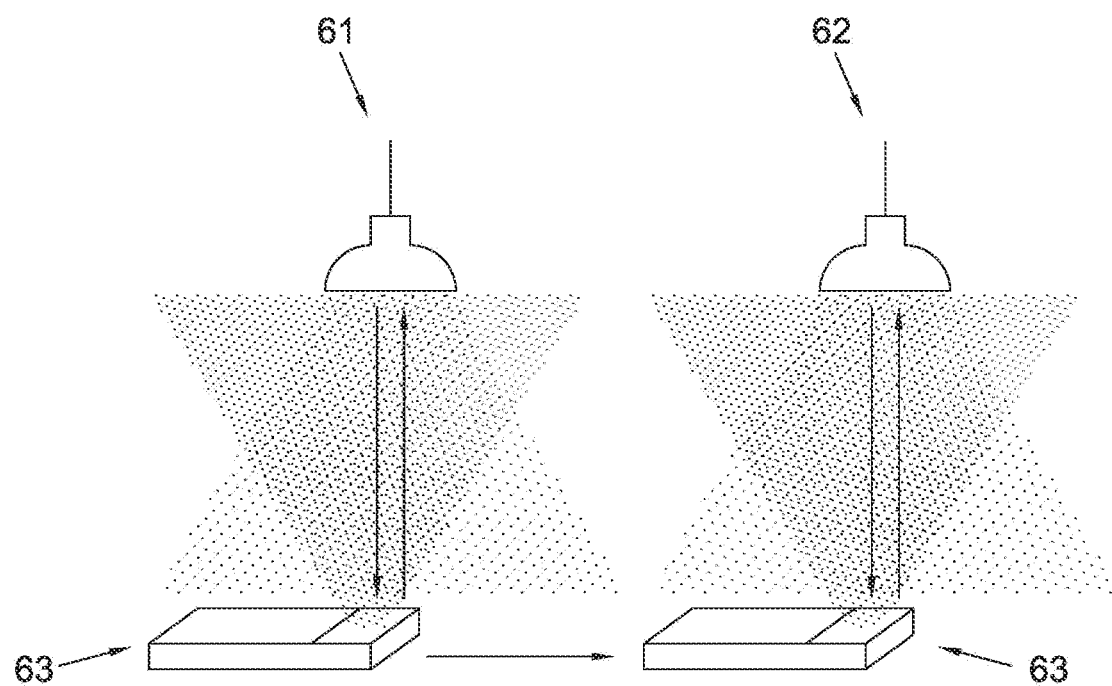
FIG. 6 shows a schematic diagram of two optical communication wireless access points and a remote device.

FIG. 6 is a schematic diagram of a first wireless access point 61, a second wireless access point 62 and a remote device 63. Both the wireless access points 61 and 62 can communicate with the remote device. This arrangement allows the transfer of data between the first wireless access point and the second access point, by means of the remote device 63, which may download data from the access point, and then when the user is in the vicinity of the second device, upload data to the second access point. FIG. 6 shows the remote device 63 in the field of the first access point 61 and then moved into the field of the second access point 62. In this way, the remote device can act as a conduit for data transfer between two separate access points.

Although one-way data transfer is shown in FIG. 6, a first bi-directional communication channel can be created between the first access point 61 and the remote device 63 and a separate second bi-directional communication channel can be created between the remote device 63 and the second access point. In other words, an indirect bi-directional optical communication link between two independent access points can be created using a single remote device. Indirect links can allow distribution of data storage between non-networked access points, as data can be downloaded from the first access point 61 to the remote device 63 and when the user is in the vicinity of the second access point the data can be uploaded.

FIG. 6 shows a bi-directional optical communication link created between two access points 61 and 62 via a remote device 63. As both access points 61 and 62 have the capability of sending and receiving optical communication signals, a direct bi-directional optical communication link could alternatively be created between access points 61 and 62 without using remote device 63. Indirect and direct optical communication link can provide node to node communication as part of a larger mesh network involving more access points and remote devices. A formed mesh network can be connected to an external network or operate independently. By operating independently risk from a physical breach is removed therefore increasing security and preventing data loss. Distributed storage algorithms can also be applied to increase redundancy of available data. For example, maintenance files for a part can be made available even if a single light needs to be replaced. Distributed security algorithms could also be used to increase security of available data by ensuring that multiple events occur before permission is granted. As an example, a network of lights could be configured such that lights need to be visited in a particular sequence to allow access to data.

Figure 7:
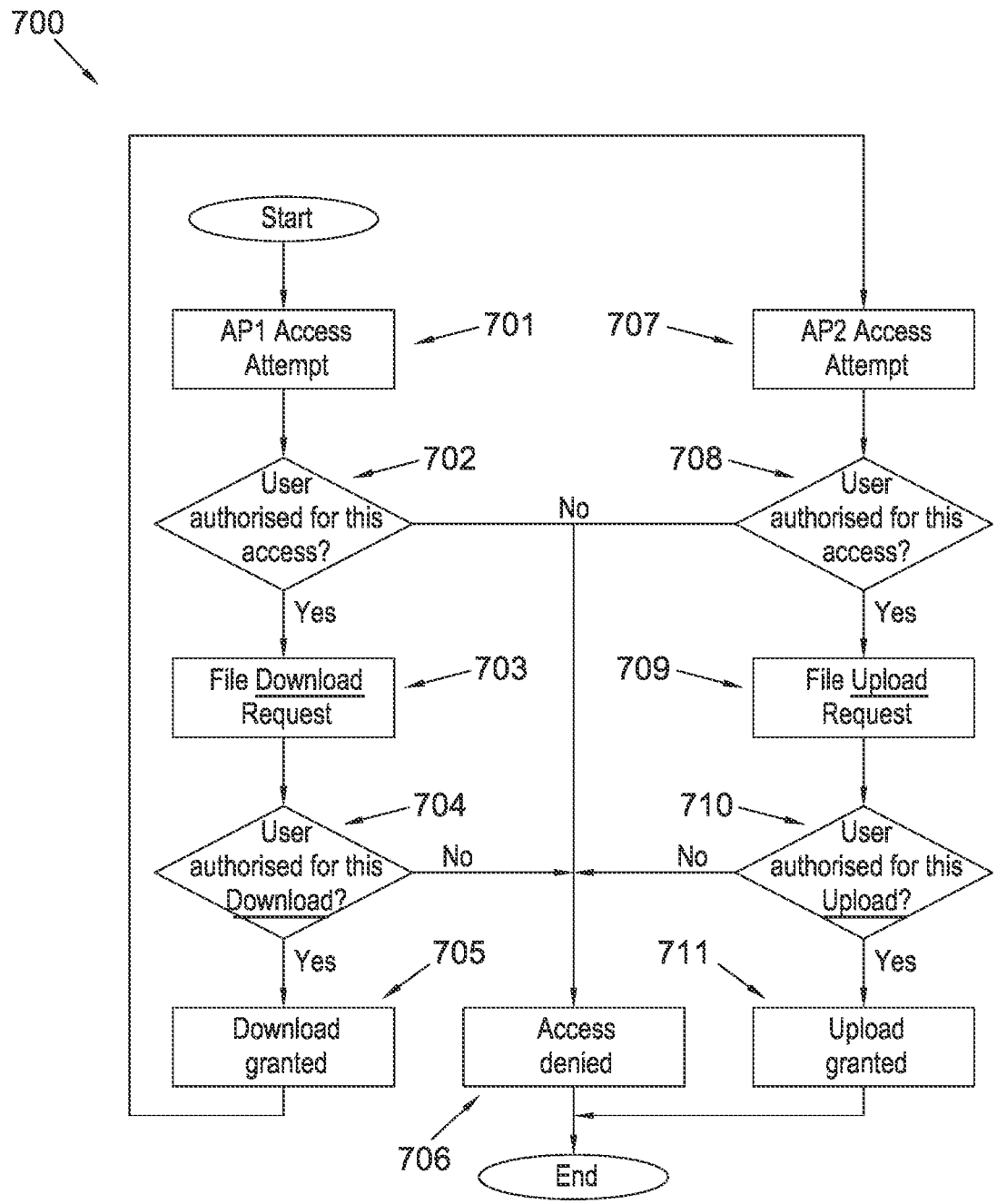
FIG. 7 is a flowchart showing a procedure for transferring data.

FIG. 7 shows a flowchart 700 of a data transfer procedure that can be described with reference to the system of FIG. 6. As described above with reference to FIGS. 4 and 5, each access point has access to permission information containing a set of permitted actions for a given set of authorised users. For data transfer to be successful the following two actions must be permitted for an authorised user: a download stage from a first access point (AP1) 62 and an upload stage for the second access point (AP2) 63.

The procedure of flowchart 700 begins with an access attempt made by the user to access AP1 701. This corresponds to the beginning of the download stage. At step 702, the access point AP1 determines whether or not the user 63 is authorised for access to AP1 by comparing the user 63 using the user permission information available to the access point AP1. Following a successful authorisation of the user, the user 63 is now an authorised user for AP1. The authorised user 63 makes a file download request 703. The file download request contains specific details of the action requested by the authorised user 63. The download request is examined at step 704 to assess whether the user is authorised for the download. This is done using the action permission information associated with the file to be downloaded. If it is determined that the authorised user 63 is permitted to carry out the requested download of the file then permission to download the file stored on the wireless access point AP1 is granted at step 705, thereby allowing successful completion of the download stage of the data transfer procedure and the file will then be downloaded to the device of the user 63. If it is determined that the user is not authorised at step 702 or if an authorised user is not permitted to carry out the requested download at step 704, then access to the access point AP1 is denied 706 thus terminating the data access procedure of flowchart 700.

A successful completion of the download stage of the data transfer procedure 700 is followed by the upload stage. The upload stage commences with an access attempt made to the second access point AP2. At step 708, the access point AP2 determines whether or not the user 63 is authorised for access to AP2 by comparing the user 63 using the user permission information available to the access point AP2. Following a successful authorisation of the user, the user 63 is now an authorised user for AP2. The authorised user 63 makes a file upload request 709. The file upload request contains specific details of the action requested by the authorised user 63. The upload request is examined at step 709 using the action permission information associated with the file to be uploaded. If it is determined that the authorised user 63 is permitted to carry out the requested upload of the file then permission to upload the file to AP2 is granted at step 711 thereby allowing successful completion of the upload stage of the data transfer procedure and the file will then be uploaded to AP2 from the device of the user 63 thus completing the data transfer procedure. If it is determined that the user is not authorised at step 708 or if an authorised user is not permitted to carry out the requested upload at step 710, then access to the access point AP2 is denied 711 thus terminating the data access procedure of flowchart 700.

Figure 8:
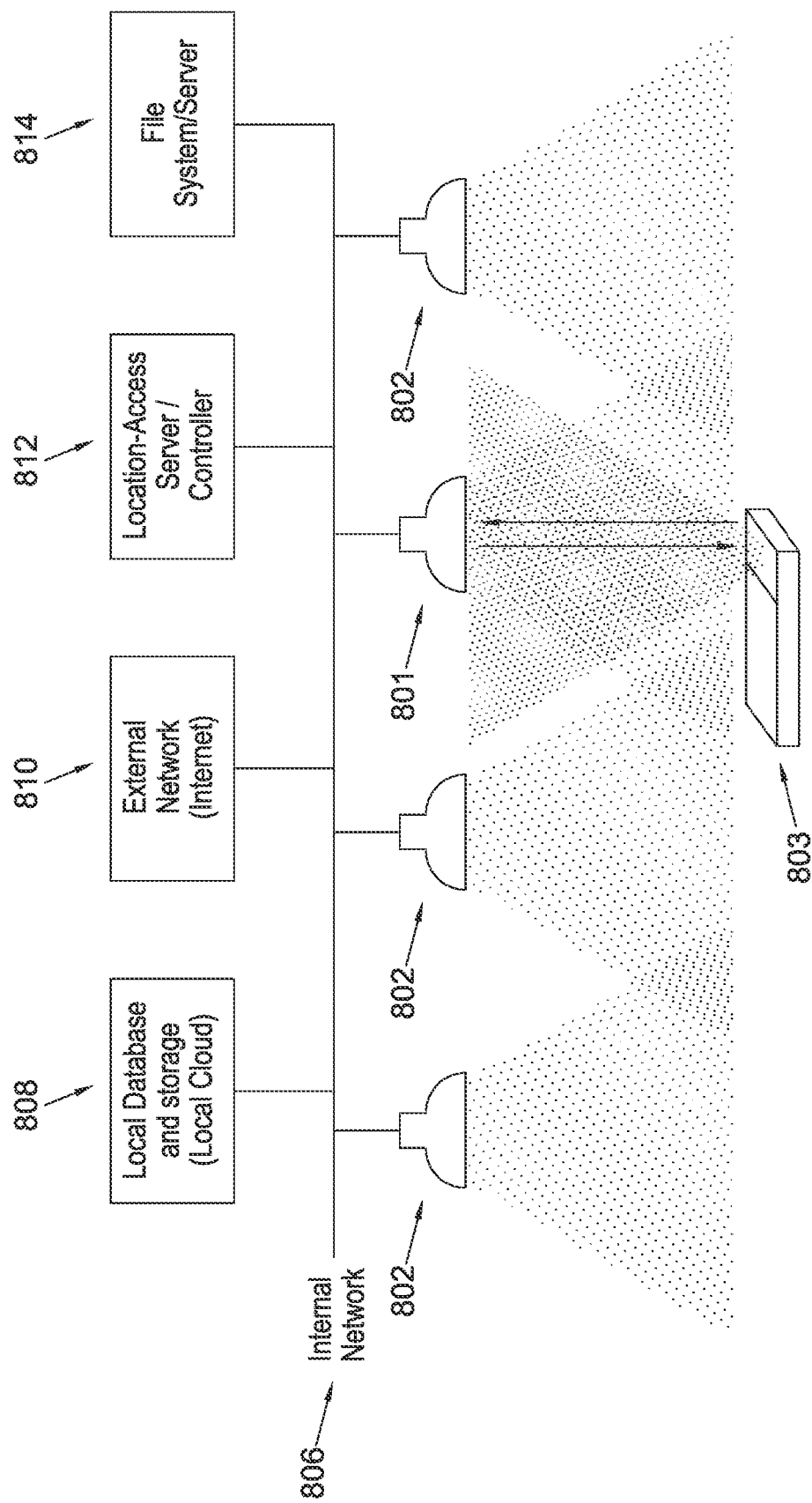
FIG. 8 is a block diagram of a network infrastructure.

FIG. 8 shows an example of a network infrastructure in which multiple access points can be incorporated. As before, each access point has local, accessible memory/data storage. FIG. 8 shows linked access point 801 and unlinked access points 802. Linked access point 801 is linked to external device 803 through an optical communication link. Unlinked access points 802 are not linked to the external device 806. Remote device 803 can be linked to unlinked access point by moving the remote device into their projected optical communication fields. Linked access point 801 and unlinked access points 802 are connected together on an internal network 806. The internal network provides local cloud storage 808, and is connected to a location-access server 812 and a server 814. The local cloud 808 is a database and storage device local to the internal network. Although shown as a separate functional block, the local cloud 808 is distributed memory formed by the local memories in each of the access points. This distributed memory is accessible via the optical communication links and over the internal network 806. Optionally, if needed, further storage could be provided. An external network 810 may be provided (for example using the embodiment of FIG. 3(*b*)). The external network 810 is a secondary network connected to the internal network 806. The external network 810 can be the internet. The location-access server hosts location access information associated with access points 801, 802 on the internal network 806. The file system 814 can be stored on a server and is connected to the internal network. Typically, the file system 814 does not exist as a separate physical entity, but instead is a logical entity with the infrastructure distributed across some or all of the local access points. Content may be stored on a linked access point 801, on any of the unlinked access points 802 or the local cloud 808 or the external network 810.

FIG. 8 shows just one example of a network infrastructure. The access points 801 and 802 have the capability of creating direct and indirect optical communication links with other access points, which can supplement existing network capabilities. The access points can act as local nodes connected to a larger network. In this way, a mesh network can be formed allowing big data and distributed storage processes. Increasing the number of local nodes to an existing network provides a significant increase in available network storage capacity allowing distributed storage over the network, and increased network edge capacity. Additionally, a redundant or even distributed storage system can improve the security of the data stored on the network.

By networking the visible light access points, a user has access to all data stored in the various access points. Modification of the stored data can be affected from a single entry point. The distributed storage of data increases the resilience of the network and the data itself providing additional privacy and security on the available access point memory. The location, which can be uniquely leveraged by the light medium, can be used as part of the identification process to improve the network access security and encryption of the stored data. Furthermore, the location of the visible light access point can be used as part of a policy to determine user permissions and access data. Each light bulb could be connected in a meshed network where no single device hosts all of the data. A specific combination of multiple lights being visited in a particular order may result in allowing access to specific data or decrypting it.

Location relevant data can be stored on non-networked and networked multi-access point distributions. This could be location specific data that may need to be updated and manipulated, but does not necessarily need to be connected to the network. An example could be the lights in a specific location of an aircraft hangar where detailed information about a specific part may be necessary but would only need to be used in that one location and therefore all data pertaining to that part would be dynamically adjusted and digitally maintained on that specific (one or set-of) light.

To increase security and prevent data loss through simple physical breach, each of the lights in a specific location can be connected in a meshed network that is not connected to an external network (in this case the external network 810 would be either not connected or not used). Distributed storage algorithms could be used to increase the redundancy of the available data, i.e., ensure that the maintenance files for a part are available even if the single light where that information is available needs to be replaced. Distributed security algorithms could be used to increase the security of the available data by ensuring that multiple events must occur before permission is granted, e.g. accessing a particular sequence of lights via LiFi. In another embodiment, the external network 810, the location access server/controller 812 and the file system server 814 could be omitted. This would provide a simple network of access points connected via an Ethernet cable and switch, thereby turning the lighting infrastructure into a local cloud server.

Figure 9:
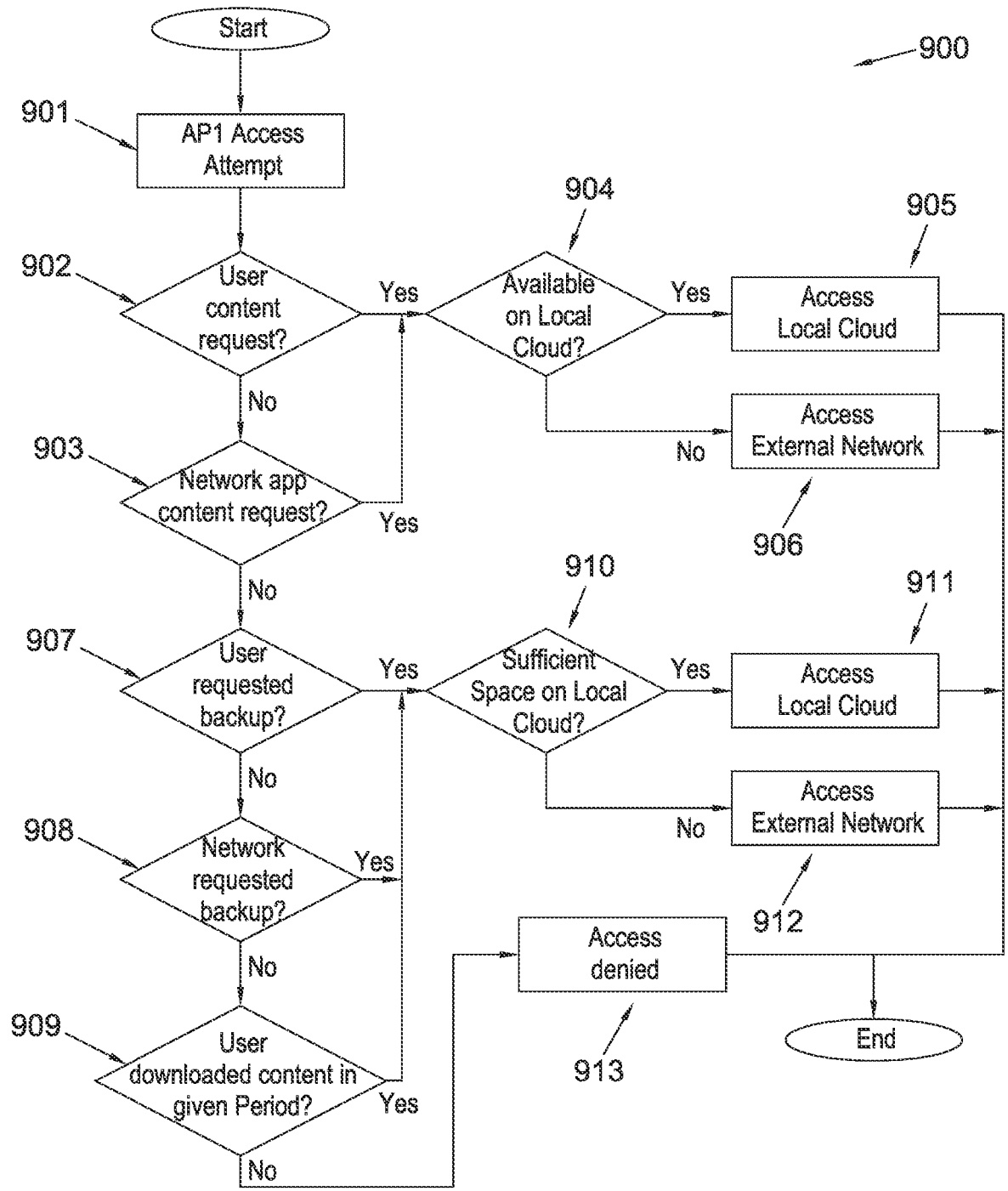
FIG. 9 is a flowchart showing local cloud data flow.

FIG. 9 shows a flowchart 900 of a local cloud data flow procedure using the infrastructure of FIG. 8. A user 806 or an application on the network makes an access point request 901 to the linked access point 801. Following an access attempt, it is determined what the nature of the access attempt 901 is. Steps 902 and 903 determine whether or not the request is to access content. In particular, step 902 determines if the request to access content is a request from a user 806 and step 903 determines if the request is a request for content from a network application. If the request is for content then the procedure proceeds to step 904 which involves determining whether the content request is available on the local cloud 808. If the content is available on the local cloud, access is granted 905 to local cloud. If the content is not available on the local cloud then access is granted 906 to the external network. Local cloud access 905 is described in further detail below in reference to FIGS. 10, 11 and 12.

The access request may not be a request to access content and may instead be a request to backup data. Step 907 involves determining if a user is requesting backup and step 908 involves determining if a network application is requesting backup. If either a user or a network application is requesting backup of data, then the procedure continues to step 910. Step 908 determines if a user has downloaded content in a given period and if so then the procedure continues to step 910. Step 910 determines if there is sufficient space on the local cloud 810 in which to store a backup. If sufficient space exists then access is granted 911 to the local cloud. If sufficient space does not exist on the local cloud then access is granted to the external network 912. Following successful access the procedure is completed. If the access attempt is not a request to access content or backup data or if content has not been downloaded in a given period 909 then access is denied 913.

Step 903 determines whether the access attempt was a request by an application on the network. If the request corresponds to either to a user content request or to a network application content request then step 904 follows.

Step 904 determines whether or not the content requested is available on the local cloud. If the content requested is available on the local cloud, then an access request is granted 905 to the local cloud 808. Access to local cloud is described in further detail below with reference to FIGS. 10, 11 and 12. If it is determined that content is not available on the local cloud then access is granted 906 to the external network.

Figure 10:
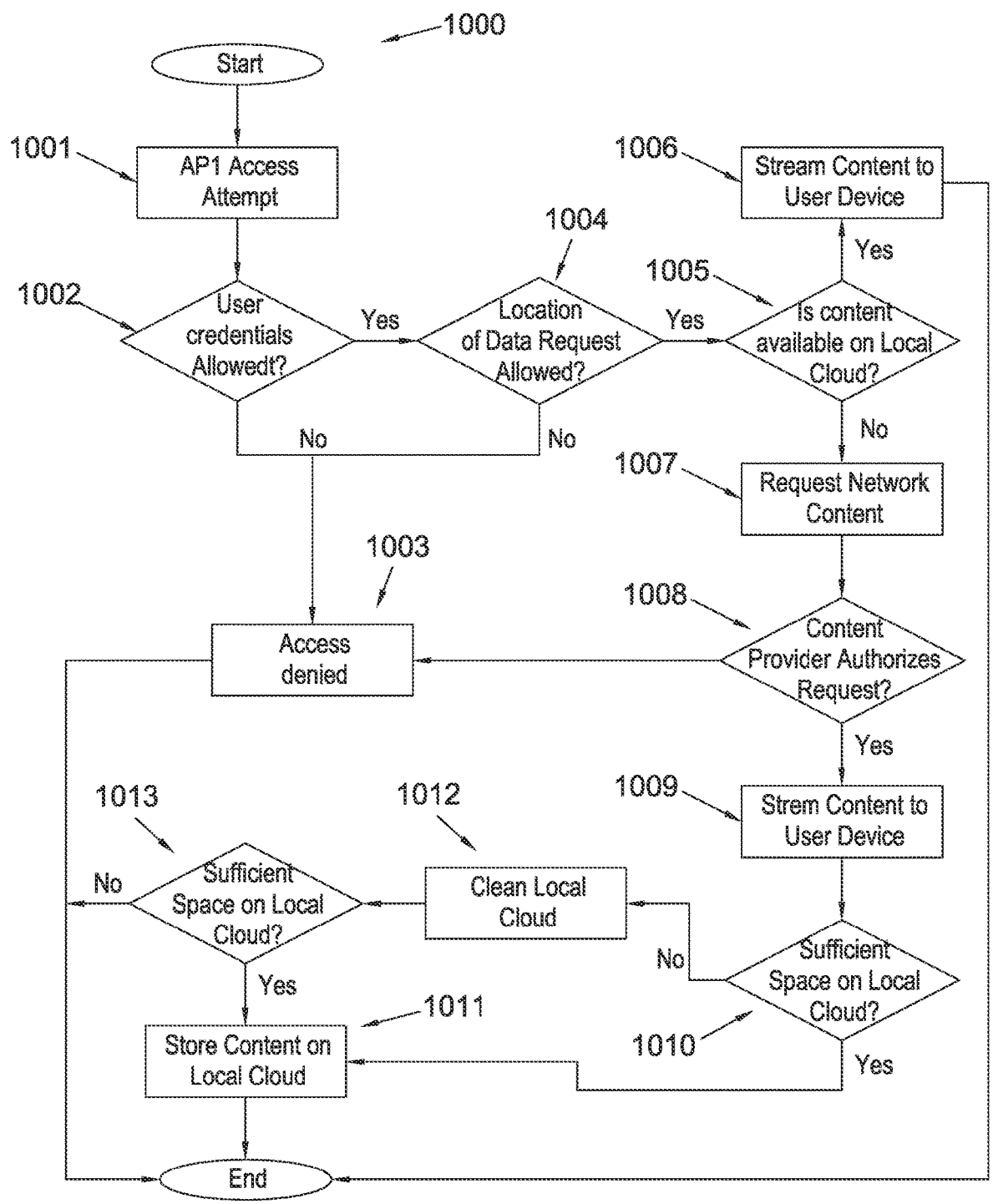
FIG. 10 is a flowchart showing local cloud access using a pull and store method.

FIG. 10 shows a flowchart 1000 that describes local cloud access in further detail. Flowchart 1000 outlines the steps behind a pull and store technique in reference to the equipment shown in FIG. 8. The pull and store technique is described with reference to a user request for content. Briefly, if content is not available on the local cloud 808 then a request is made to an external network 810 for content to be streamed. This content can then be pulled from the external network 810 and stored on the local cloud 808 for subsequent access. The pull and store method allows content to be made available locally to the user to reduce strain on network.

The pull and store method begins at step 1001 with an access attempt made to linked access point 801. Step 1002 involves assessing credentials of the user 806 and determining if these are allowable. This step can take place on the access point 801. If the credentials are not allowable then access is denied 1003 at this first stage. If the user credentials are allowable then step 1004 evaluates the location of the request using the location-access information stored on the location-access server 812. This may correspond to the location of the access point 801. If the location of the request is determined to be not allowed then access is denied 1003. If the location of the request is allowed then the method proceeds to step 1005. In one example, specific data may have location access information associate with it such that a specific combination of multiple access points must be visited in a particular order to allow access to specific data or decryption of the data.

Following a successful location request, step 1005 determines if the content that is requested is available on the local cloud 808. If the content is available on the local cloud, then the content is streamed to the device of the user 1006 thus completing the procedure. If content is not available on the local cloud then a new request is made to request content from the external network 1007. If the content provider authorizes the request to access content then content is streamed to the user device 1009. If the content provider does not authorize the request then access to the content is denied 1003.

Method 1000 continues with content being streamed from an external network 810 to the device of the user 806. This involves pulling content from the external network 810. In order to reduce strain on infrastructure between external network and device of the user the method 1000 has further steps that allow content streamed from the external network 810 to be stored on the local cloud 808. Step 1010 determines if there is sufficient space on the local cloud 808. Sufficient means enough space to store the content being streamed from the external network 810. If sufficient space exists then the content is stored on the local cloud. If sufficient space does not exist then the further step of cleaning the local cloud 1012 is completed before again determining whether or not sufficient space on the local cloud exists 1013. The clean local cloud method 1012 is described in more detail with reference to FIG. 12. If there is still not sufficient space on the local cloud following the clean local cloud step, then the procedure ends without content being stored on the local cloud 808.

Figure 11:
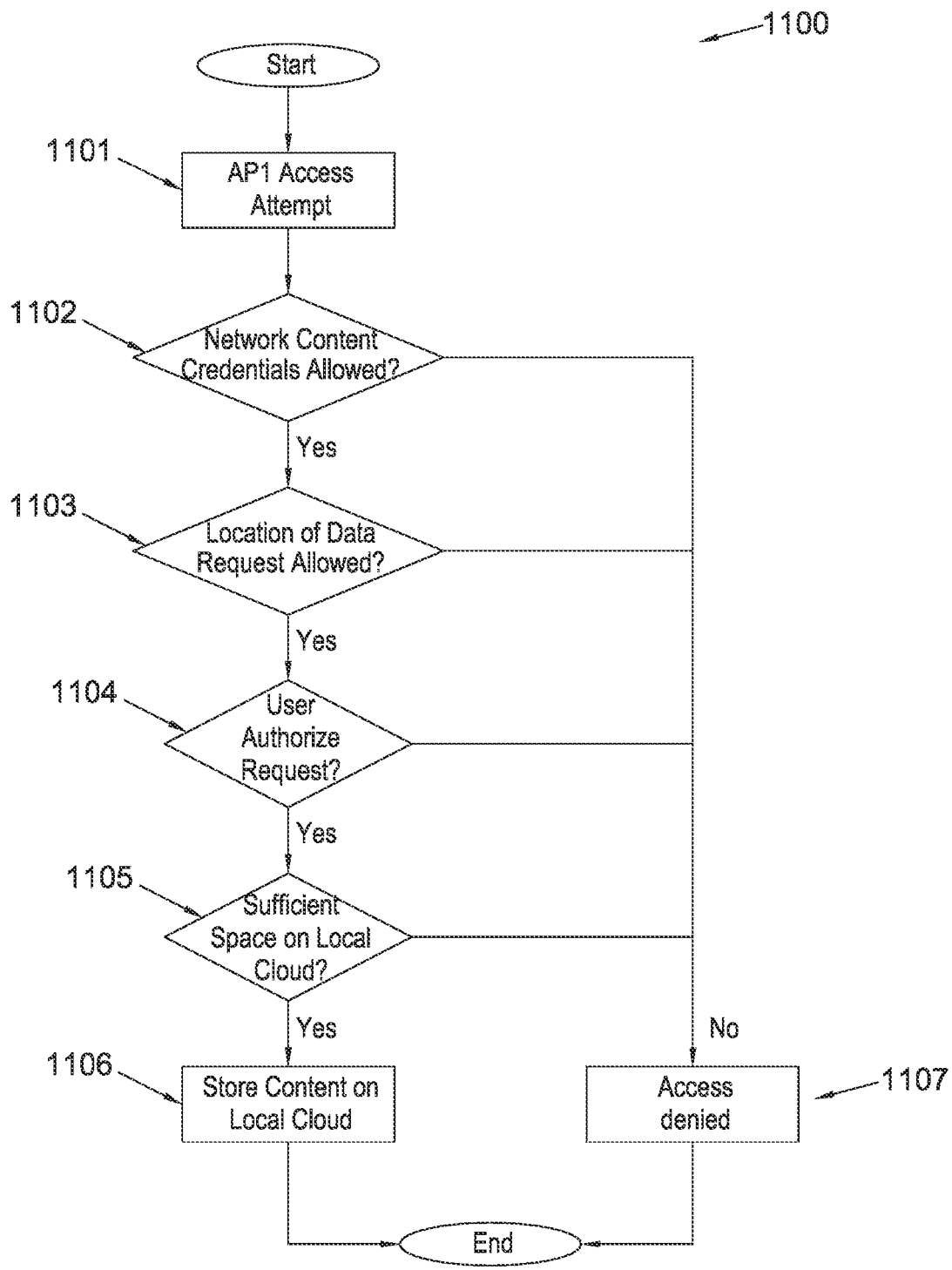
FIG. 11 is a flowchart showing local cloud access using a push and store method.

FIG. 11 shows a flowchart 1100 describing local cloud access. Flowchart 1100 describes a push and store method described with reference to the equipment of FIG. 8. The result of the method of FIG. 11 is content being stored on the local cloud. In contrast to FIG. 10, the push and store method is instigated by the network content provider with a request to push content from the external network 810 to the local cloud 808.

Step 1101 of flowchart 1100 is an access attempt by the network content provider made to access point 801. Step 1102 involves checking that the network content provider credentials are allowable. If the network content credentials are allowed then the method checks that the location of the data request is allowable. This is verified using location data information found on the location-access server. Following allowable location verification the user must authorise the request by the network content provider to access the access point at step 1104. If the user authorizes the request then step 1105 establishes whether or not there is sufficient space available on the local cloud. If sufficient space is available then the content is stored on the local cloud 1106. Should the method fail at any of steps 1102, 1103, 1104 or 1105 then access is denied 1107.

Figure 12:
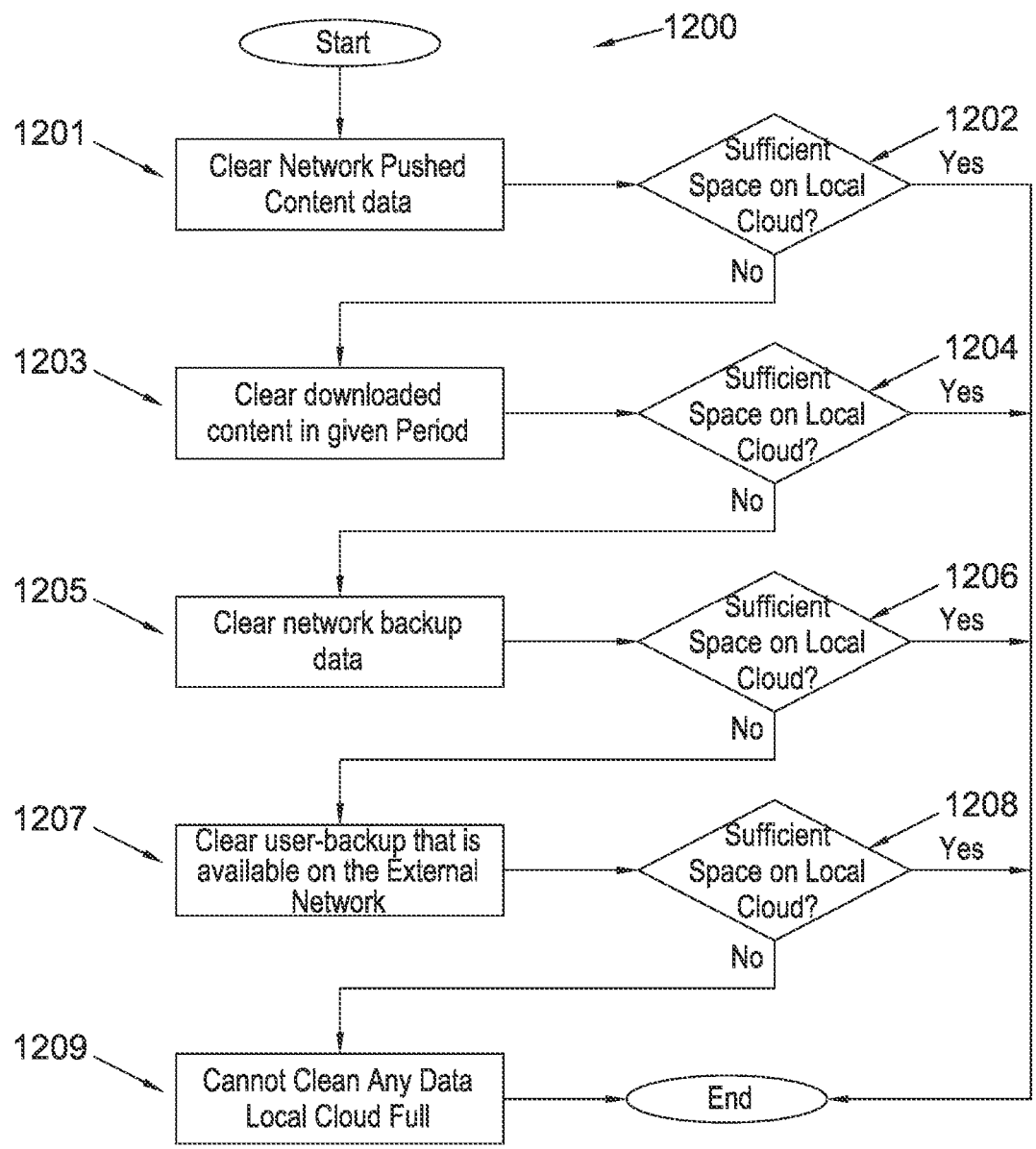
FIG. 12 is a flowchart showing a method for cleaning a local cloud.

FIG. 12 shows a schematic flowchart 1200 describing a method of cleaning the local cloud 808. Flowchart 1200 is a further description of step 1012 and may incorporate step 1013 of flowchart 1000 and is thus described with reference to FIG. 8. Step 1201 involves clearing content data that has previously been pushed to the local cloud from the external network, for example using the method described with reference to FIG. 11. Step 1202 involves testing if there is sufficient space on the local cloud 808. If there is not sufficient space on the local cloud the method proceeds to step 1203. Step 1203 involves clearing downloaded content within a given period. Step 1204 involves testing if there is sufficient space on the local cloud 808. If there is not sufficient space on the local cloud the method proceeds to step 1205. Step 1205 involves clearing network backup data. Step 1206 involves testing if there is sufficient space on the local cloud. If there is not sufficient space on the local cloud the method proceeds to step 1207. Step 1207 involves clearing user-backup data that is available on the external network 810. Step 1208 involves testing if there is sufficient space on the local cloud 808. If there is not sufficient space on the local cloud 808 the method proceeds to step 1209. Step 1209 involves a local cloud that is full. In this case, no data can be cleaned and the method terminates. If step 1202, 1204, 1206, or 1208 verifies that there is sufficient space on local cloud, then the method ends and the cloud has been sufficiently cleared.

Having local storage in an optical access point has numerous applications and advantages. For example, the optical access point can be used as a personal, local storage facility for device/user dependent file access. Also, it enables highly localised broadcasting of advertising content, and distribution of information in general, e.g., stored information transmitted from LED emergency signage. It also allows location-specific storage access. For example, lights in shop windows, streetlamps, traffic lights, illuminated street furniture, etc. could broadcast information relevant to that specific location. In a classroom environment, in the science room the local optical access point(s) could hold science books, examples, exercises, etc. In a museum, the local optical access point(s) could hold specific information relevant to the particular room. In the home environment, local optical access point(s) could be used to store recipes in the kitchen, whereas in the living room the optical access point(s) could store movies, etc. At a manufacturing site, the local optical access point(s) could store drawings, 3d models, all information relevant to the particular location, etc. Equally, the local optical access point(s) could be used as a place for people to leave messages/data.

Using light avoids interference and/or eavesdropping from neighbouring wireless systems for dedicated high-speed wireless access to the relevant storage. As another option, data storage devices could be accessed underwater wirelessly (e.g., subsea data servers and data centres). Information can also be stored in intrinsically-safe environments to enhance safety. In some embodiments, using multiple lights provides the opportunity for increased and distributed storage in a system, all of which can be accessed via an optical communication link. In some embodiments, the light access point is not connected to an external network and so the data that is hosted is only available in one location. This provides increased privacy and security of the data, thereby increasing the resilience.

A skilled person will appreciate that variations of the enclosed arrangement are possible without departing from the invention. For example, location relevant data can be stored on non-networked and networked access point distributions. In certain circumstances, this data may need to be updated and manipulated without necessarily having a connection to an external network. For example, a set of one or more lights in a specific location of an aircraft hangar can store detailed information relating to a specific part that only needs to be used in that one location. This information does not need to be shared over the network as a whole but can be dynamically adjusted and manipulated on that specific set of lights. Accordingly, the above description of the specific embodiment is made by way of example only and not for the purposes of limitation. It will be clear to the skilled person that minor modifications may be made without significant changes to the operation described.

The invention claimed is:

1. An optical communication system comprising:
   an optical access point device configured to provide access to content data, the optical access point device comprising:
   a transmitter and a receiver configured to respectively transmit and receive optical wireless communication signals over an optical wireless communication channel configured to provide optical wireless communication with a remote device;
   an accessible non-temporary storage memory configured to store the content data,
   wherein the content data stored in the accessible non-temporary storage memory is accessible by the remote device via an optical wireless communication channel; and
   a further optical access point device configured to provide access to further content data, the further optical access point device comprising:
   a further transmitter and a further receiver configured to respectively transmit and receive further optical wireless communication signals over a further optical wireless communication channel to provide further optical wireless communication with the remote device; and
   a further accessible non-temporary storage memory configured to store the further content data,
   wherein the optical access point device is configured to download the content data from the accessible non-temporary storage memory via the optical wireless communication channel to the remote device in response to receiving an access request from the remote device,
   wherein the further optical access point device is configured to upload the downloaded content data from the remote device, via the further optical wireless communication channel, and store the downloaded content data that was uploaded in the further accessible non-temporary storage memory, and
   wherein at least one of the optical access point device that comprises the accessible non-temporary storage memory or the further optical access point comprising the further accessible non-temporary storage memory is connected to one or more lighting fixtures.

2. The optical communication system of claim 1, wherein the optical access point device is configured to receive the further content data from the further optical access point via the remote device and to store the further content data in the accessible non-temporary storage memory.

3. The optical communication system according to claim 1,
   wherein the remote device is configured to transfer the content data from the optical access point device to the further optical access point device, and to transfer the further content data from the further optical access point device to the optical access point device, via the optical wireless communication channel and further optical wireless communication channel, to provide distributed storage of the content data and further content data in the accessible non-temporary storage memory and the further accessible non-temporary storage memory respectively for access to the content data or further content data by the remote device and/or at least one other remote device.

4. The optical communication system of claim 1,
   wherein the optical access point device and further optical access point device are configured to allow the remote device or at least one other remote device to upload content data to the accessible non-temporary storage memory or further accessible non-temporary storage memory or to download, to delete, move, and/or modify the content data from the accessible non-temporary storage memory and/or the further content data from the further accessible non-temporary storage memory.

5. The optical communication system of claim 1,
   wherein the optical access point device and the further optical access point device are indirectly linked via a remote device.

6. The optical communication system of claim 1,
   wherein the optical access point device and the further optical access point device are independent of each other and/or are un-networked.

7. The optical communication system of claim 1,
   wherein at least one of the accessible non-temporary storage memory or the further accessible non-temporary storage memory is a networked accessible non-temporary storage memory, and
   wherein the content data or the further content data in the networked accessible non-temporary storage memory is accessible to be moved, modified, or deleted by access to the content data or the further content data using a network associated with the optical communication system.

8. The optical communication system of claim 7, wherein the network is configured to be accessed by the remote device connected by the optical wireless communication channel to a networked optical access point device.

9. The optical communication system of claim 7, wherein at least one of the accessible non-temporary storage memory and the further accessible non-temporary storage memory are networked to provide a distributed memory that is accessible by the remote device or accessible to the network.

10. The optical communication system of claim 9, wherein the content data or the further content data is downloadable from the distributed memory to the remote device from the optical access point device or the further optical access point device in the network, and/or
wherein the content data or the further content data is uploadable to the distributed memory from the remote device from the optical access point device or the further optical access point device in the network.

11. The optical communication system of claim 1, wherein at least one of the optical access point device or the further optical access point device is configured to access the content data in at least one of the accessible non-temporary storage memory or the further accessible non-temporary storage memory based on location of the remote device.

12. The optical communication system of claim 1, wherein at least one of the optical access point device or the further optical access point device is configured to allow access to the accessible non-temporary storage memory, responsive to receipt from the remote device of a password and/or encryption key.

13. The optical communication system of claim 1, wherein at least one of the optical access point device or the further optical access point device is configured to allow only an authorized user or an authorized remote devices access to the accessible non-temporary storage memory or further accessible non-temporary storage memory.

14. The optical communication system of claim 7, wherein the network comprises at least one of a local network, a local area network, an internal network, a mesh network, or an external network.

15. The optical communication system of claim 9, wherein a location of the optical access point device or a location of the further optical access point device is used as part of a policy to determine user or remote device permissions for access to the content data.

16. The optical communication system of claim 9, wherein at least one of the optical access point device or the further optical access point device are part of a distributed cloud storage system.

17. The optical communication system of claim 9, wherein access to the distributed memory on the network is determined by at least one of user credentials or network content provider credentials.

18. The optical communication system of claim 1, wherein the optical access point device or the further optical access point device is configured for connection to an external network and/or an internet, and wherein the optical wireless communication channel is configured to provide a bidirectional communication channel for sending data to and receiving data from the remote device.

19. The optical communication system of claim 1, wherein the content data comprises at least one of visual content, written content, audio content, or video content.

20. The optical communication system of claim 1, wherein the accessible storage non-temporary memory comprises at least one of a flash memory, a solid state based memory or a hard disk, and
wherein the optical access point device further comprises a random-access memory.

21. The optical communication system of claim 1, wherein the optical wireless communication signals transmitted and/or received over the optical wireless communication channel are at wavelength(s) in a range 1 nm to 2500 nm.

22. The optical communication system of claim 1, wherein the remote device comprises a mobile device.

23. The optical communication system of claim 1, wherein the accessible non-temporary storage memory is configured to provide network edge storage.

24. A method of providing storage of data, the method comprising:
providing, by an optical access point device, access to content data stored in an accessible non-temporary storage memory that is accessible by a remote device via an optical wireless communication channel;
transmitting and/or receiving optical wireless communication signals over the optical wireless communication channel configured to provide optical wireless communication with a remote device;
providing, by a further optical access point device, access to further content data stored in a further accessible non-temporary storage memory via a further optical wireless communication channel; and
transmitting and/or receiving further optical wireless communication signals over the further optical wireless communication channel configured to provide further optical wireless communication with the remote device,
wherein the optical access point device is configured to download the content data from the accessible non-temporary storage memory via the optical wireless communication channel to the remote device in response to receiving an access request from the remote device,
wherein the further optical access point device is configured to upload the downloaded content data from the remote device, via the further optical wireless communication channel, and store the downloaded content data that was uploaded in the further accessible non-temporary storage memory, and
wherein at least one of the optical access point device that comprises the accessible non-temporary storage memory or the further optical access point comprising the further accessible non-temporary storage memory is connected to one or more lighting fixtures.

* * * * *

UNITED STATES PATENT AND TRADEMARK OFFICE
CERTIFICATE OF CORRECTION

| | |
|---|---|
| PATENT NO. | : 11,239,915 B2 |
| APPLICATION NO. | : 17/155906 |
| DATED | : February 1, 2022 |
| INVENTOR(S) | : Burchardt et al. |

It is certified that error appears in the above-identified patent and that said Letters Patent is hereby corrected as shown below:

On the Title Page

(30) Foreign Application Priority Data: Please correct "1603822" to read -- 1603822.6 --

Signed and Sealed this
Seventeenth Day of May, 2022

Katherine Kelly Vidal
*Director of the United States Patent and Trademark Office*